United States Patent
McNamer et al.

(10) Patent No.: US 6,636,905 B1
(45) Date of Patent: Oct. 21, 2003

(54) METHOD FOR ANALYZING INPUT/OUTPUT PERFORMANCE OF A DATA PROCESSING SYSTEM

(75) Inventors: Timothy R. McNamer, Brooklyn Center, MN (US); Timothy L. Nelson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/277,313

(22) Filed: Mar. 26, 1999

(51) Int. Cl.[7] .................. G06F 11/30; G06F 17/40; G06F 11/34; G06F 15/18; G21C 17/00

(52) U.S. Cl. ................. 710/15; 710/18; 702/182; 702/186; 702/187; 709/101; 714/37; 714/47; 717/127; 717/128; 717/131

(58) Field of Search ............................ 709/223, 224, 709/107; 370/233, 234, 245, 253; 714/25, 37, 38, 41, 45, 47; 702/182, 183, 186, 187; 710/15, 16, 18, 5; 717/127, 128, 131

(56) References Cited

U.S. PATENT DOCUMENTS

| | | | | |
|---|---|---|---|---|
| 4,849,879 A | * | 7/1989 | Chinnaswamy et al. | 706/45 |
| 5,062,055 A | * | 10/1991 | Chinnaswamy et al. | 702/182 |
| 5,483,468 A | * | 1/1996 | Chen et al. | 702/186 |
| 5,615,357 A | * | 3/1997 | Ball | 703/21 |
| 5,623,598 A | * | 4/1997 | Voigt et al. | 714/47 |
| 5,729,397 A | * | 3/1998 | Ottesen et al. | 360/69 |
| 6,055,492 A | * | 4/2000 | Alexander et al. | 702/179 |
| 6,108,782 A | * | 8/2000 | Fletcher et al. | 713/153 |
| 6,122,664 A | * | 9/2000 | Boukobza et al. | 709/224 |
| 6,158,024 A | * | 12/2000 | Mandal | 714/37 |
| 6,269,410 B1 | * | 7/2001 | Spasojevic | 710/5 |
| 6,321,264 B1 | * | 11/2001 | Fletcher et al. | 709/224 |
| 6,324,528 B1 | * | 11/2001 | Hillson et al. | 705/400 |
| 6,332,178 B1 | * | 12/2001 | Dean et al. | 702/179 |
| 6,374,367 B1 | * | 4/2002 | Dean et al. | 714/37 |
| 6,442,585 B1 | * | 8/2002 | Dean et al. | 709/108 |

* cited by examiner

Primary Examiner—Jeffrey Gaffin
Assistant Examiner—Tanh Q. Nguyen
(74) Attorney, Agent, or Firm—Charles A. Johnson; Mark T. Starr; Crawford, Maunu, PLLC

(57) ABSTRACT

A method for analyzing input/output performance of a data processing system. The method comprises providing records of input/output operations performed by the data processing system. Each record has statistics related to a respective input/output operation for a respective process. One or more workload classes are specified for accumulating statistics, and the statistics from the input/output records are accumulated by workload class. The accumulated statistics are reported by workload class which supports analysis of the input/output behavior for different workload classes.

19 Claims, 3 Drawing Sheets

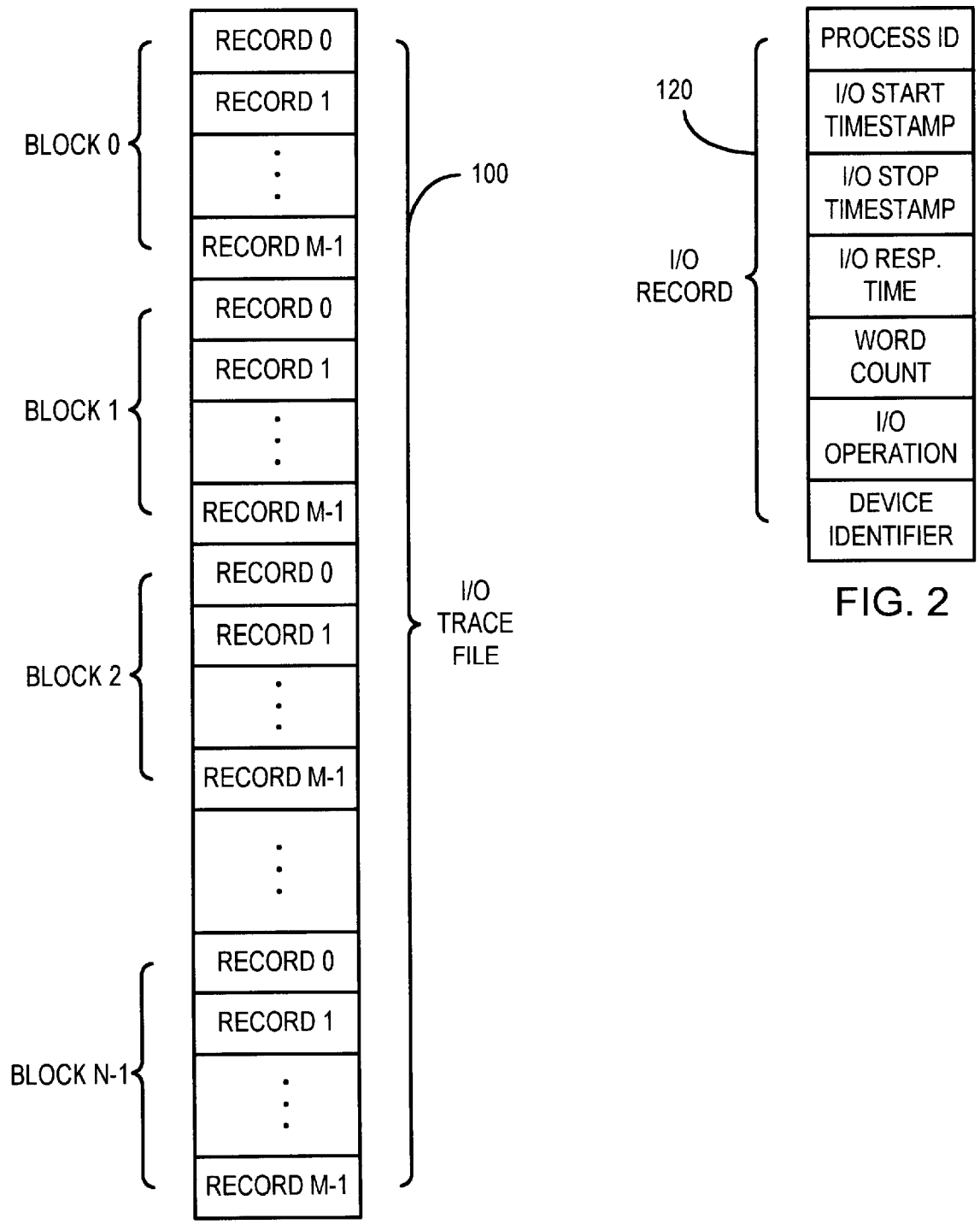

METHOD FOR ANALYZING INPUT/OUTPUT PERFORMANCE OF A DATA PROCESSING SYSTEM

FIELD OF THE INVENTION

The present invention generally relates to analyzing performance of a data processing system, and more particularly to analyzing input/output performance of a system.

BACKGROUND OF THE INVENTION

Various performance characteristics of data processing systems are modeled to demonstrate the capabilities of different system configurations. For example, the number of instructions/second executed by the system may be particularly relevant for some applications, while the number of input/output operations/second may be of interest for other applications. Hardware and software vendors often use proprietary tools to model a system's performance and project a performance increase when new hardware and/or software is added to the system.

In one example, Unisys Corporation uses a modeling tool to determine whether an outboard file cache, such as the Extended Processing Complex (XPC) product from Unisys, would enhance system performance. To use the model, the customer supplies a record of all input/output operations that occurred during a period of time for a present system. The record of input/output operations is then processed using the model to determine the performance level of the system with the addition of an outboard file cache.

As recognized by those skilled in the art, large scale data processing systems generally host different classes of workloads. For example, the 2200 Series data processing systems from Unisys support batch, demand, transaction, and background classes of workloads. Different input/output statistics have different levels of relevance for the different workloads. For example, the average response time can be calculated from the record of input/output operations. The response time statistic is of interest for demand and transaction workloads because there are typically users waiting for system responses. However, the response time statistic is of less relevance for batch and background workloads since these workloads don't have end users waiting for responses.

Records of input/output operations are generally limited to process identifiers, word counts, and timestamps. Thus, modeling tools may be limited in the performance characteristics that can be reported. While a modeling tool may project a level of performance increase for an entire system, the tool may not provide any indication as to the performance increase for a particular class of workload. For example, the modeling tool may project an improved response time for the system, but provide no indication for demand workloads because the record of input/output operations has no indication of the workload class.

A method and apparatus that addresses the aforementioned problems, as well as other related problems, are therefore desirable.

SUMMARY OF THE INVENTION

A method for analyzing input/output performance of a data processing system is provided in various embodiments of the invention. In one embodiment, the method comprises providing records of input/output operations performed by the data processing system. Each record has statistics related to a respective input/output operation for a respective process. One or more workload classes are specified for accumulating statistics, and the statistics from the input/output records are accumulated by workload class. The accumulated statistics are reported by workload class which supports analysis of the input/output behavior for different workload classes.

In another embodiment, the method comprises providing records of input/output operations performed by the data processing system. Each record includes an operation-start timestamp, an operation-stop timestamp, an operation-type code, a data item count, and a device identifier. One or more workload classes are specified for the accumulation of input/output statistics, and the statistics are accumulated by workload class input/output from the records of input/output operations. The accumulated input/output statistics are then reported by workload class.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 1 is a block diagram of an example file containing records of input/output operations;

FIG. 2 is a block diagram that illustrates the content of an example input/output trace record;

Figure 3:
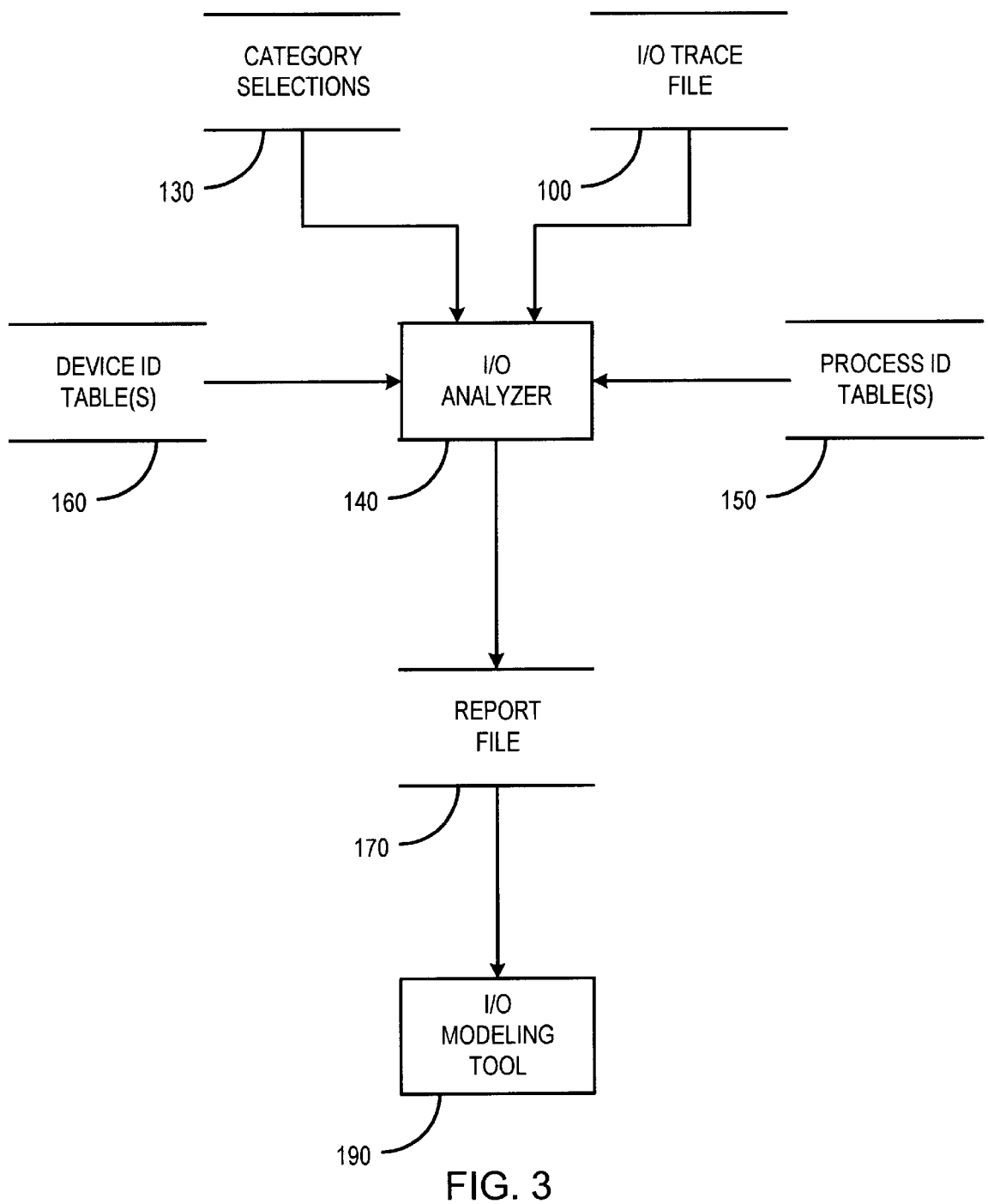
FIG. 3 is a data flow diagram that illustrates using I/O trace file records to model system performance by workload class.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intent is to cover all modifications, equivalents, and alternatives falling within the spirit and scope of the invention as defined by the appended claims.

DETAILED DESCRIPTION OF THE DRAWINGS

The present invention is believed to be applicable to a variety of systems for modeling the performance of data processing systems. The present invention has been found to be particularly applicable and beneficial in modeling the input/output performance of various workload classes. While the present invention is not so limited, an appreciation of the present invention is presented by way of a particular example application, in this instance, in the context of an example system in which input/output statistics are gathered and characterized by types of processes which indicate a workload class.

In an example embodiment, a file of input/output operations that spans a selected period of time is provided as input. Using workload classes (e.g., process types) that are user-specified, statistics are accumulated by workload class for the record of input/output operations. The workload classes of the process identifiers in the record of input/output operations are obtained from a system table having associations of process identifiers to workload classes. The input/output statistics are then reported by workload class. Thus, a user can see the input/output statistics for a present system configuration, and the statistics can be further provided as input to a modeling tool to see how a new system configuration would impact performance of the input/output operations.

FIG. 1 is a block diagram of an example file 100 containing records of input/output operations. Example file 100 contains records that are conventionally logged by input/output routines of an operating system, for example, the OS-2200 operating system from Unisys.

File 100 is comprised of n blocks, designated block 0–block n–1. Each block includes m records. File 100 is organized by block for the purpose of making efficient use of input/output resources. Specifically, m records are accumulated in the system's memory before logging them to trace file 100. This supports writing large data elements with a few operations rather than writing many small data elements with many operations.

FIG. 2 is a block diagram that illustrates the content of an example input/output trace record 120. Those skilled in the art will appreciate that input/output trace records could assume a variety of different forms and include different and/or additional content, depending on system requirements and capabilities.

Relative to the example embodiment, record 120 includes the following fields: process ID; I/O start timestamp; I/O stop timestamp; I/O response time; word count; I/O operation; and device identifier. The process ID field identifies the process that initiated the logged I/O operation.

The I/O start timestamp is the system time at which the I/O operation commenced. That is, the time at which an I/O routine was initiated by the calling application. The I/O stop timestamp is the system time at which control is returned from the I/O routine to the calling application.

The I/O response time is the difference between the start timestamp and the stop timestamp. Thus, the response time is the duration of system time between when the I/O routine was initiated and when control was returned to the calling application.

The word count field indicates the number of words involved in the I/O operation. It will be appreciated that other measures of data quantities could be used in other embodiments.

The I/O operation indicates the particular operation performed. For example, the operation may be a read operation or a write operation.

The device identifier field indicates the particular device with which the I/O operation occurred. For example, the device identifier may be a particular tape drive or disk drive in a system.

FIG. 3 is a data flow diagram that illustrates using I/O trace file records to model system performance by workload class. I/O trace file 100 and category selections 130 are provided as input to I/O analyzer 140. I/O analyzer 140 accumulates I/O statistics by category as specified in category selections file 103. For example, I/O statistics are accumulated by workload class as specified in category selections file 130.

The workload classes of the process IDs contained in trace file 100 are obtained from process ID table 150. Process ID table 105 is a conventional table as maintained by an operating system, for example. Similarly, device ID table 160 contains a mapping of device identifiers to types of devices.

I/O analyzer 140 accumulates statistics according to workload classes specified by category selections file 130. For example, I/O analyzer may determine the total number of I/O requests/second for a particular process type. In an example embodiment, the workload classes are the process types supported by OS-2200, i.e., batch, demand, mapper, transaction, and "exec." The category selections are made by specifying process identifiers in category selections file 130. It will be appreciated that in other embodiments, the workload classes may also include I/O device types and particular I/O devices.

A special type of batch process is a "background" process which is generally active throughout system runtime, for example, a communications handler. I/O analyzer 140 discards background I/O trace records in accumulating statistics for batch processes since they are always active. Since the background processes are always active, it is undesirable to consider background processes in the calculation of average batch elapsed time, where the elapsed time of a batch process is the duration from when the process starts to when the process finishes.

I/O analyzer 140 produces report file 170 indicating various accumulated I/O statistics. In one embodiment, report file 170 has statistics categorized by process type and indicates I/O statistics by device. The table below illustrates part of report file 170.

Workload Class BATCH
MASS STORAGE DEVICE ACTIVITY REPORT:

TABLE 1

| LC | LDN | Device Name | Req/second | % Reads | Avg Size | Chan/Dev Q | RET-FLD | Avg Hdw Service |
|---|---|---|---|---|---|---|---|---|
| 5 | 1 | MH0 | 0.05 | 100.00 | 1792 | 0.37 | 27.10 | 26.70 |
| 5 | 2 | MH1 | 2.26 | 49.96 | 1265 | 0.32 | 16.25 | 15.90 |
| 5 | 4 | MH3 | 0.49 | 92.78 | 1263 | 0.02 | 19.04 | 18.99 |
| 5 | 5 | MH4 | 0.22 | 95.11 | 3454 | 0.70 | 27.53 | 26.81 |
| 8 | 9 | MP0 | 0.95 | 49.95 | 1247 | 0.22 | 15.29 | 15.05 |
| 8 | 11 | MP2 | 0.30 | 14.45 | 274 | 0.66 | 17.38 | 16.69 |
| 8 | 13 | MP4 | 0.83 | 100.00 | 2360 | 0.94 | 21.93 | 20.97 |

The above illustrated portion of report file 170 is for the workload class, batch, for the identified mass storage devices. The LC column is the logical channel on which the device is connected. The LDN column is the logical device number, and the Device Name is the symbolic name of the device. The Requests/Second column is, for the associated device, the total number of I/O requests divided by the total amount of time of the sample period, in seconds.

The % Reads column indicates the percentage of the total number of I/O operations for the device that were read operations. The Average Size column indicates the average of the word count fields in the I/O trace records.

The "Chan/Dev Q" column indicates how much time, in milliseconds, was spent on the channel and device queue.

The RET-FLD column indicates the request existence time (RET) of the I/O operation minus time for file lock delays.

The "Avg Hdw Service" column indicates average hardware service time as part of the total I/O time. It will be appreciated that report file 170 includes additional tables for the various workload classes (e.g., demand and transaction) and for additional types of storage devices (e.g., tape device).

In another embodiment, report file 170 has statistics categorized by device type, and workload class statistics are indicated for the respective device types. The different device types include, for example, mass storage and tapes. Additional I/O statistics that are reported include the numbers of operations for various size ranges, total words transferred by workload class, and averages of numbers of words for read and write operations. An example table for read operations is illustrated below:

MASS STORAGE

No. Refs. with Transfer Size Range (Words)

TABLE 2

| CLASS | #Reads | 0–224 | 224–448 | 448–1792 | 1792– | Average |
|---|---|---|---|---|---|---|
| Batch | 1866751 | 317280 | 73970 | 1382586 | 92915 | 1710 |
| Demand | 33512 | 0 | 0 | 19470 | 14042 | 2542 |
| Transaction | 0 | 0 | 0 | 0 | 0 | 0 |

While Table 2 only includes statistics for read operations, the table also includes, in an example embodiment, similar statistics for write operations. While not shown, the table may also include the total number of operations (number of reads+number of writes) for a class, and an average number of words involved in all operations ((total words read+total words written)/total number of operations). It will be appreciated that similar tables are generated for other device types, such as tapes.

The data from report file 170 and statistics file 180 can be provided as input to I/O modeling tool 190. I/O modeling tool projects performance level increases for the selected workload classes if the system configuration is modified in a predetermined manner. For example, an average I/O response time can be determined from I/O trace file 100 for selected workload classes such as demand and transaction. Using predetermined scaling factors for the hardware to be added to the configuration, a projected response time can be determined and presented. It will be appreciated that the particular scaling factors and their application depend on the particular hardware being modeled. For example, the statistics output from I/O analyzer 140 would be suitable for use by tools that model outboard file cache hardware and cache disk hardware. The tool that models performance of a system with a cache disk would use different scaling factors than a tool that models performance of a system having an outboard file cache.

With prior methods, a response time could be projected based on a proposed configuration. However, because the prior method did not differentiate between batch and demand workloads and the batch response times were considered in establishing the average response time, the projected response time would be skewed. Thus, the present method, which differentiates between the different classes of workloads, can more accurately project a performance level increase.

Figure 4:
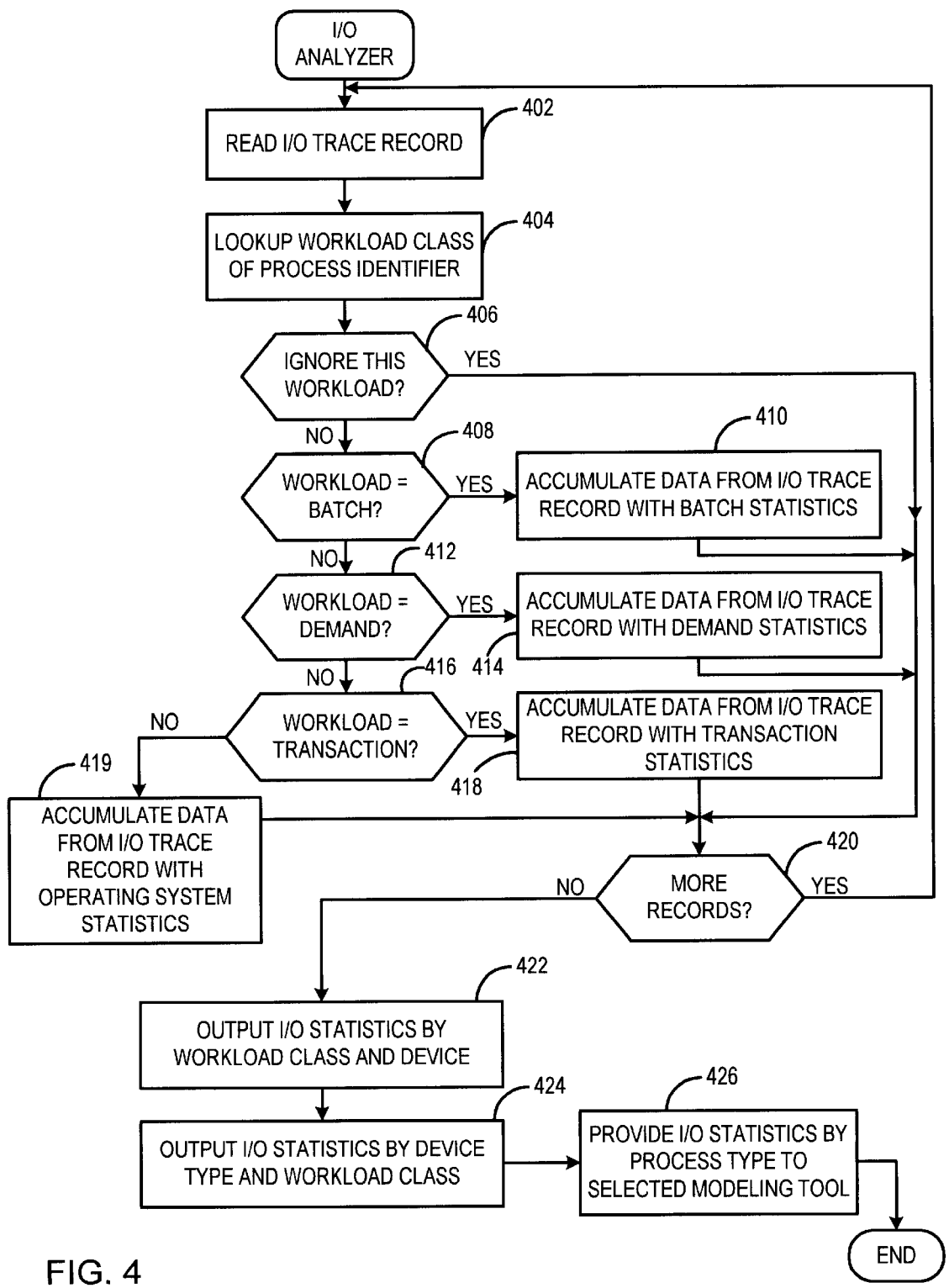
FIG. 4 is a flowchart of processing performed by I/O analyzer in accordance with an example embodiment of the invention.

FIG. 4 is a flowchart of processing performed by I/O analyzer 140 in accordance with an example embodiment of the invention. The process generally entails reading a record from I/O trace file 100, discarding the record if it does not match any of category selections 130, and accumulating statistics for the workload class of the record. Since the workload class of an I/O operation is not indicated by an I/O trace record 120, process ID table 150 is consulted to obtain the associated workload class.

At step 402 a record is read from I/O trace file 100. Step 404 obtains from process ID table 150 the workload class associated with the process ID indicated in the record. If the workload is not of the type for which I/O statistics are desired, then the record is ignored. Otherwise, control is directed to decision step 408. As indicated previously, the I/O operations of a workload class such as background may be ignored since they may skew the average batch elapsed time. It will be appreciated that in another example embodiment operating in an OS-2200 environment, I/O trace file 100 may be preprocessed for the purpose of identifying which of the batch processes are background processes, since background processes are of the workload class batch.

Once the background processes have been identified, the associated process IDs can be included in category selections 103 to indicate which records to discard.

Decision step 408 tests whether the workload class is batch. If so, control is directed to step 410 where the data in the record are accumulated with I/O statistics for the batch workload. The various statistics include, for example, the total number of batch I/O operations, the total number of batch read operations, the total word count for batch I/O operations; the total batch response time, the maximum batch word count for read operations, and the maximum batch word count for write operations. Similar statistics are accumulated for demand, transaction, and Exec ("Exec" is shorthand for the OS-2200 operating system) workloads at steps 412–414, 416–418, and 419, respectively. It will be appreciated that statistics for other workload classes could be accumulated in other embodiments.

If there are more records to process in I/O trace file 100, decision step 420 returns control to step 402. Otherwise, control is directed to step 422. At step 422, a first set of statistics is output. The first set of statistics is organized by workload class and device, as illustrated in Table 1 above.

At step 424 a second set of statistics is output. The second set of statistics is organized by device type, and within each device type by workload class.

The output statistics can then be provided as input to I/O modeling tool 190. In an example embodiment, the output statistics can be reformatted using commas as data delimiters. The statistics can then be parsed and transferred to a Excel spreadsheet, for example. The spreadsheet is preprogrammed to calculate I/O times for the different workload classes, factoring in some portion that is operating system I/O for each class.

Accordingly, the present invention provides, among other aspects, modeling by workload classifications input/output performance of a data processing system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A method for analyzing input/output performance of a data processing system, comprising:

providing records or input/output operations performed by the data processing system, each record having statistics related to a respective input/output operation;

specifying one or more workload classes, wherein the one or more workload classes are selected from the group of batch workload class, demand workload class, and transaction workload class, and operating system workload class;

accumulating the statistics from the records of input/output operations by the one or more workload classes of computer program processes that initiated the input/output operations described by the records; and reporting accumulated statistics by the one or more workload classes.

2. The method of claim 1, further comprising providing the accumulated statistics to a tool for modeling input/output performance of the data processing system in combination with a predetermined input/output device.

3. The method of claim 2, wherein the input/output device is an outboard file cache.

4. The method of claim 2, wherein the input/output device is a cache disk.

5. The method of claim 1, further comprising:

reading process identifiers from the input/output records; and obtaining workload classes of the process identifiers from a process identification table.

6. The method of claim 1, further comprising reporting accumulated input/output statistics by device.

7. The method of claim 1, further comprising reporting accumulated input/output statistics by type of device.

8. The method of claim 1, further comprising bypassing accumulation of statistics for a selected workload class.

9. The method of claim 8, wherein the selected workload class is background workload class.

10. The method of claim 1, wherein the statistics in each input/output record include an operation-start timestamp and an operation-stop timestamp.

11. The method of claim 10, wherein each input/output record includes an operation-type code.

12. The method of claim 11, wherein the operation-type code indicates either a read operation or a write operation.

13. The method of claim 12, wherein the statistics in each input/output record include a data item count indicating a quantity of data involved in the input/output operation.

14. The method of claim 10, wherein each input/output record includes a device identifier.

15. A method for modeling input/output performance of a data processing system, comprising:

providing records of input/output operations performed by the data processing system, each record including an operation-start timestamp, an operation-stop timestamp; an operation-type code, a data item count, and a device identifier;

specifying one or more workload classes, wherein the one or more workload classes are selected from the group of batch workload class, demand workload class, and transaction workload class, and operating system workload class;

accumulating by workload class input/output statistics from the records of input/output operations; and reporting accumulated input/output statistics by workload class.

16. The method of claim 15, further comprising reporting accumulated input/output statistics by device.

17. The method of claim 16, further comprising reporting accumulated input/output statistics by type of device.

18. The method of claim 15, further comprising reporting respective total input/output operation times by process type.

19. The method of claim 18, further comprising reporting respective average input/output operation times by workload class.

* * * * *